United States Patent

[11] 3,596,852

[72] Inventor George H. Wakefield
Highland, Md. 20777
[21] Appl. No. 746,029
[22] Filed July 19, 1968
Continuation-in-part of Ser. No. 552,499,
May 24, 1966, Pat. No. 3,497,163.
[45] Patented Aug. 3, 1971

[54] SUPERSONIC AIRCRAFT
11 Claims, 16 Drawing Figs.
[52] U.S. Cl. .................................................. 244/13,
244/1, 244/53, 244/130, 239/265.13
[51] Int. Cl. .................................................. B64c 3/16,
B64d 33/04
[50] Field of Search ...................................... 244/130,
53, 54, 55, 1, 13; 239/265.13; 181/33, 221

[56] References Cited
UNITED STATES PATENTS
2,877,965 3/1959 Wakefield .................... 244/15

3,053,477 9/1962 Reiniger ....................... 244/12
3,265,331 8/1966 Miles ............................. 244/53
3,302,657 2/1967 Bullock ......................... 244/53 (X)

Primary Examiner—Milton Buchler
Assistant Examiner—James E. Pittenger
Attorney—Mason, Mason and Albright ABSTRACT: A supersonic aircraft having retractable wings and stabilizer controls wherein the leading edge of the airfoil is a continuous air inlet and the fuselage and all remaining portions of the aircraft are situated largely downstream of the air inlet, the aircraft being substantially T-shaped in configuration, a large portion of the shock wave generated by the aircraft being received into the air inlet. At least a portion of the jet exhaust is deflected into the shock wave produced by the aircraft at supersonic speeds for the purpose of disrupting the shock wave. Rapid deceleration of the aircraft from supersonic to sonic speeds obtained by extension of retractable airfoils and stabilizers.

INVENTOR
GEORGE H. WAKEFIELD

INVENTOR
GEORGE H. WAKEFIELD

BY Mason, Mason & Albright
ATTORNEYS

PATENTED AUG 3 1971 3,596,852
SHEET 3 OF 5
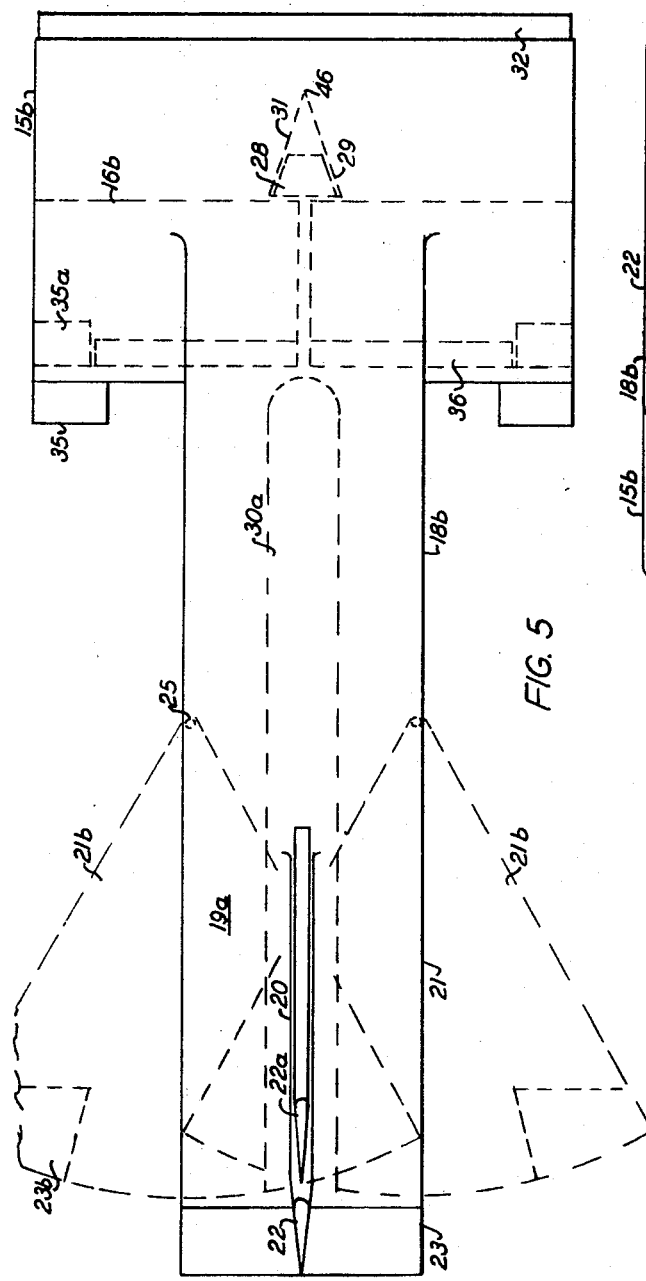
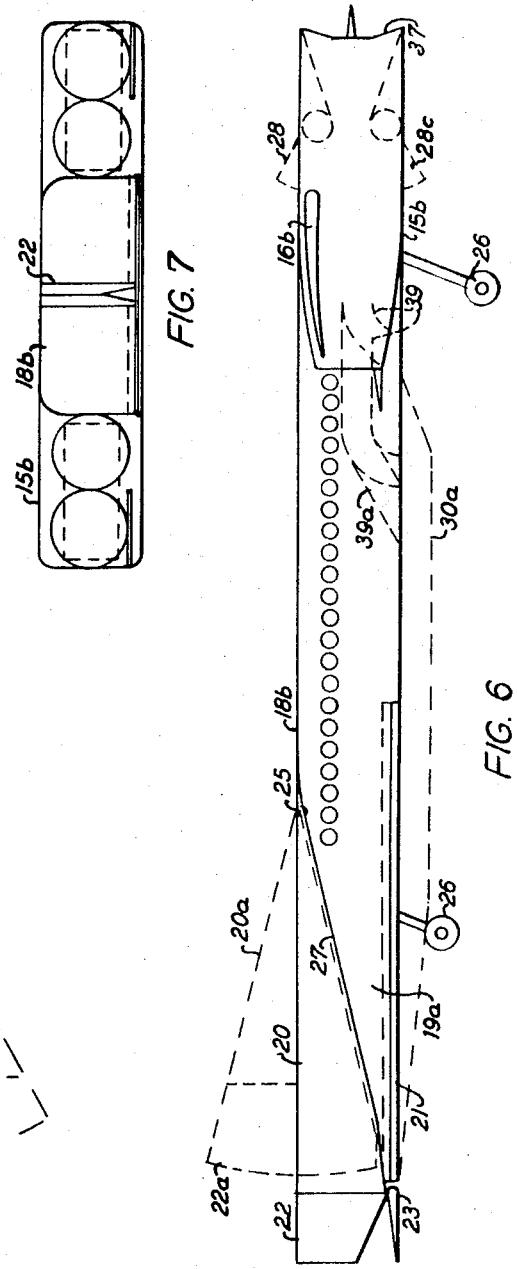
INVENTOR
GEORGE H. WAKEFIELD
BY
Mason, Mason & Albright
ATTORNEYS

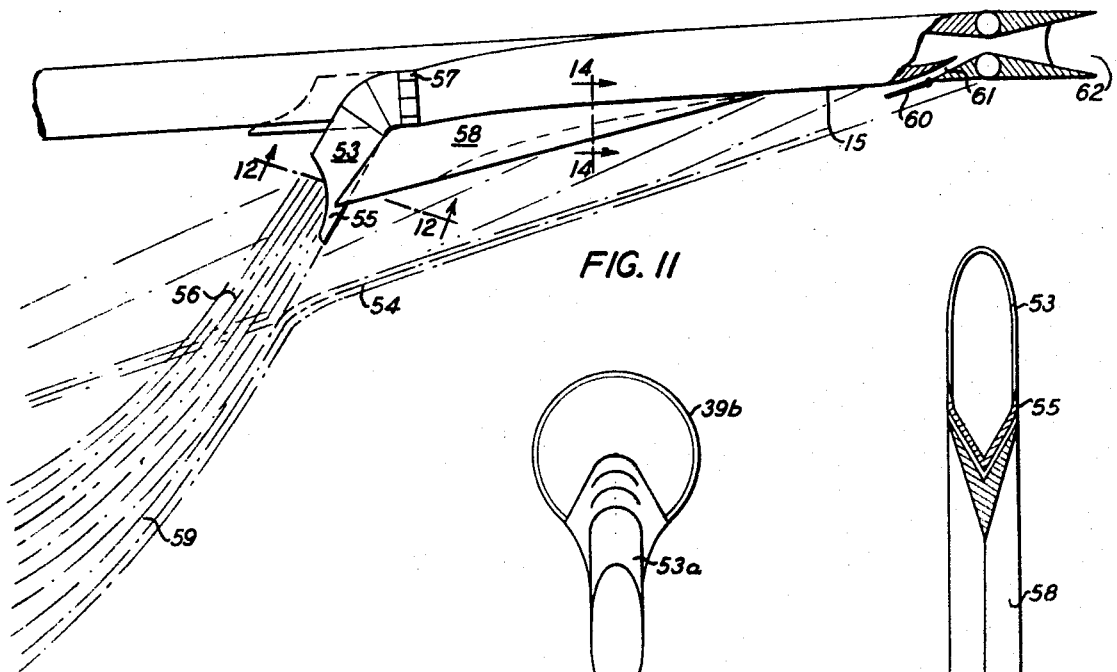
FIG. 11
FIG. 13
FIG. 12
FIG. 14
FIG. 15
FIG. 16
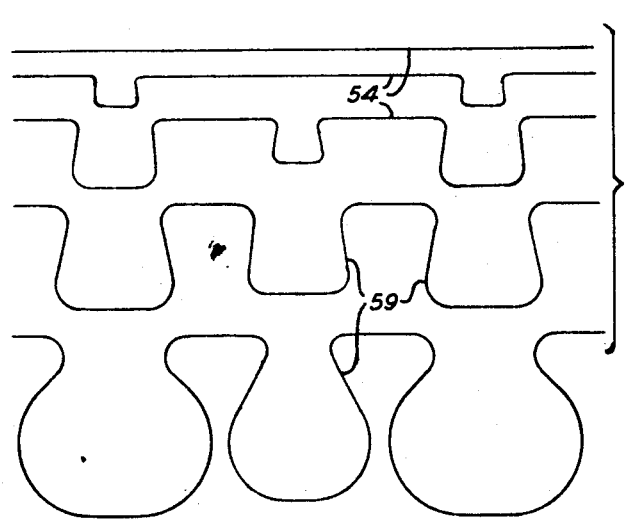
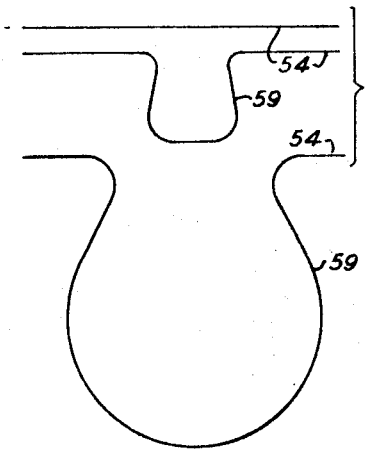
INVENTOR
GEORGE H. WAKEFIELD
BY
Mason, Mason & Albright
ATTORNEYS

SUPERSONIC AIRCRAFT

CROSS-REFERENCES TO RELATED APPLICATIONS

This is a Continuation-in-part of application Ser. No. 552,499, filed May 24, 1966, now Pat. No. 3,497,163.

OBJECTS OF THE INVENTION

This invention relates to aircraft and more particularly to improvements in supersonic aircraft.

The main object of the invention is to produce a supersonic aircraft that operates very efficiently at high supersonic speeds, particularly at design speed and altitude, and vary effectively at subsonic speeds, thereby greatly extending the flying range of supersonic aircraft. A large air inlet is required for an air-breathing engine in a rarefied atmosphere. In the invention advantage is taken of this in several ways. At design speeds and altitude this air inlet area becomes a most favorable shelter from the relative wind behind which the whole aircraft is located, except for a small lower portion of the craft used to produce part of the aerodynamic lift. This sheltering act becomes a great means for reducing many power losses and may be used in any varying degree. Conventional and experimental supersonic aircraft design fail to appreciate that the air inlet area may be utilized for many other purposes.

Another object of the invention is to reduce the craft's frontal drag area to a minimum—if not eliminate it altogether. The frontal drag produced by the front windows in the present supersonic aircraft is enormous. That produced by the protruding fuselage is even more. In the aircraft of the invention this great power loss is prevented by using the leading edge adjustable air inlet to double as cabin windows and as engine ram compressor parts. The aircraft shape is thus brought into the most efficient working relationship in respect to its jet engines and their air inlets. The external heating effect, and the external heating area both are reduced to a minimum. Boundary layer power losses cannot be appreciably reduced unless there is a less disturbed air flow past the craft. This also has been accomplished. By these same procedures and contrary to expectation, an immense housing capacity for passengers or freight is also made available.

Not limiting the invention but when reference is made to design speed and altitude, speeds between Mach 1.8 and 4.4 and elevations between 60,000 and 125,000 feet are contemplated.

Another object of the invention is to reduce and eliminate objectionable shock wave noises such as the sonic boom produced by aircraft at transonic and supersonic speeds.

Another object is to construct, arrange and combine aircraft parts and elements in a manner so as to provide an aerodynamically stable aircraft at all operational speeds without undue sacrifice of payload, speed or range.

Another object is to more effectively utilize a rectangular shaped adjustable air inlet diffuser on the leading edge of a supersonic airfoil.

Another object is to provide suitable retractable subsonic tail and wing parts in the aircraft adapted for extension while the aircraft is travelling at supersonic speeds whereby the aircraft is rapidly decelerated to subsonic speeds.

Another object is to provide an adjustable shock wave control member for an adjustable air inlet diffuser for supersonic aircraft.

Another object is to provide a supersonic airfoil with right- and left-hand sweep-back angles in order to maneuver the center of lift produced by the retractable subsonic airfoils into a lateral line with the center of lift produced by other craft parts at supersonic speeds when the subsonic airfoils are retracted.

Another object is to make a supersonic aircraft capable of vertical or near vertical takeoff and landing by providing adjustable vertical thrust on a lateral line that passes through the craft's center of lift.

Another object is to provide a combination turbojet-ramjet engine with a forwardly extended turbine compressor to reduce the volume, not the mass of compressed air within the supersonic aircraft.

Another object is to provide supersonic aircraft with retractable canopies and to make all retractable parts fully retractable to reduce air resistance.

A yet further object of the invention is to provide a supersonic aircraft with a cabin with a forward vision through transparent duct and air inlet diffuser parts located in a supersonic airfoil.

A further object of the invention lies in the proportionate thickness and width relationships between the supersonic airfoil having considerable housing capacity and the adjoining downstream fuselage and tail.

Other objects, adaptations, and possibilities will appear as the description progresses, reference being had to the accompanying drawings.

BRIEF DESCRIPTION OF THE DRAWINGS

FIGS. 5, 6 and 7 show plan, side and rear elevational views of a still further form of the aircraft in accordance with the invention.

FIG. 11 is a fragmentary side view of an aircraft in accordance with the invention illustrating the disruption of the shock wave produced by the aircraft when traveling at supersonic speeds.

FIG. 12 is a sectional view taken on lines 12–12 of FIG. 11.

FIG. 13 is a rear view of a jet engine showing a modified deflector for the jet exhaust. FIG. 14 is a rear sectional view of a runner which underlies the supersonic wing.

FIG. 15 is a diagrammatic representation of the disruption of a sonic wave by a plurality of jet deflectors.

FIG. 16 is a diagrammatic representation of the disruption of a sonic wave by a single jet deflector.

DESCRIPTION OF THE PREFERRED EMBODIMENTS

Figure 3:
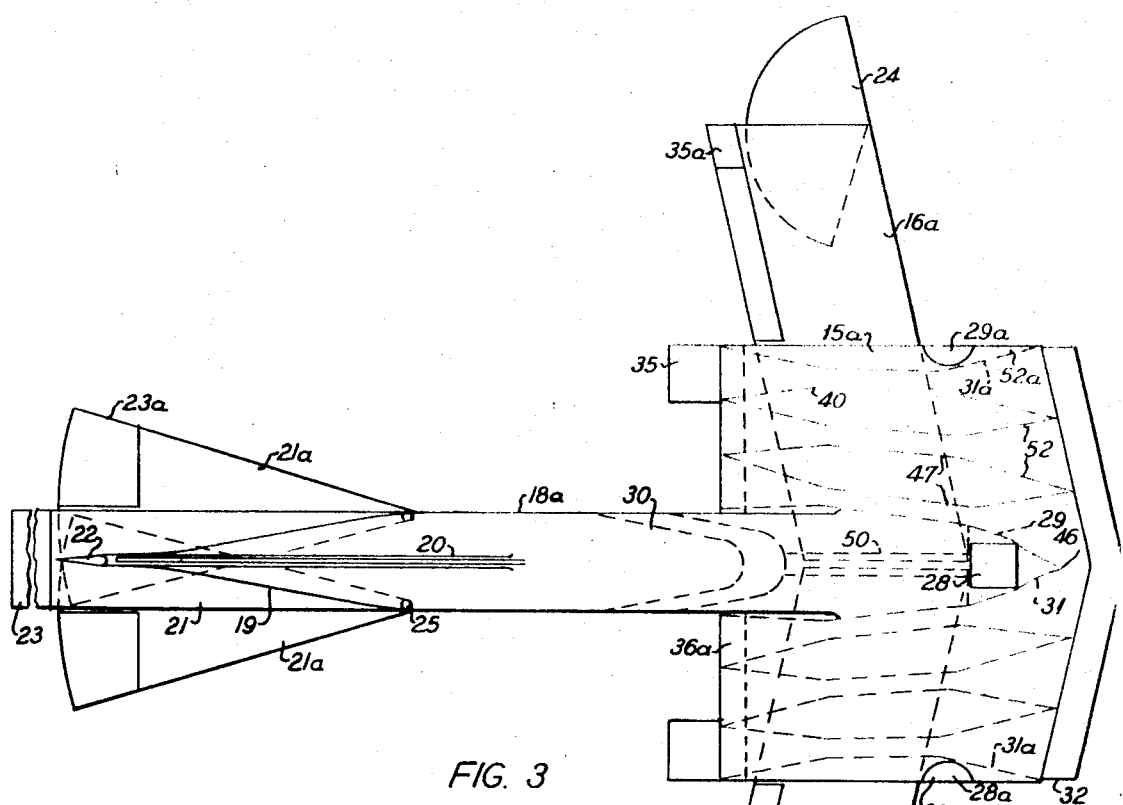
FIGS. 3 and 4 are plan and side elevational views of a further form of the invention similar to those shown in FIGS. 1 and 2.
Figure 4:
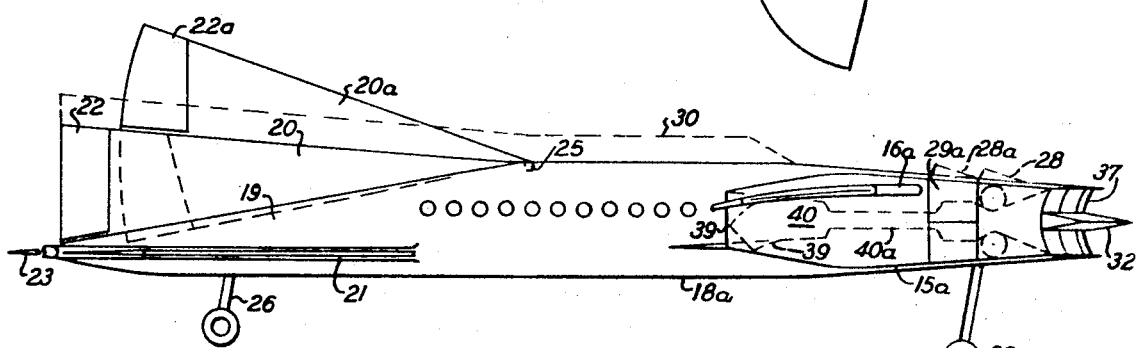

Referring now to FIGS. 1—4, it will be noted that a supersonic airfoil 15 is swept back relative to the aircraft's center line which disposition, as previously noted, facilitates the location of the retractable subsonic airfoils 16 in an appropriate life relationship to the aircraft when traveling at subsonic speeds. The tail 19 which is attached to the end of the body or fuselage 18, comprises a set of hollow vertical and horizontal stabilizers 20 and 21, respectively, which includes a rudder 22 and elevator 23 for control of the aircraft at supersonic speeds. A set of retractable vertical and horizontal stabilizers 20a and 21a, respectively, with attached rudder 22a and elevators 23a, are retractable into their respective hollow stabilizers 20 and 21 by hydraulic or other means well known to the art. It will be appreciated that the stabilizers 20a and 21a with their control surfaces 22a and 23a will normally be retracted when the aircraft is traveling at supersonic speeds. It will also be appreciated that one of the horizontal stabilizers 21a on one side of the tail 19 will be slightly higher than the one on the other side to permit the nesting of such stabilizers within the tail 19. If desired, however, the width of the retractable horizontal stabilizers 21a and 21b, FIG. 5, may be reduced and they may be butted when stored so that a vertical offset is unnecessary. This structure meets the need for more control and lift surfaces at low subsonic speeds; nevertheless, these parts need not project beyond the fuselage's width and height at high supersonic speeds. The tail portion 19 may have a configuration (such as is shown in FIGS. 3 and 4, for example) whereby the hollow stabilizers 21 may be disposed at a different vertical relationship relative to the fuselage 18a than that shown in FIGS. 1 and 2. Throughout the drawings, similar characters of reference refer to similar parts.

For control at supersonic speeds, the aircraft includes ailerons 35 which project from the trailing edge of the supersonic airfoil 15, 15a, and 15b. The retractable subsonic airfoils 16, 16a, and 16b include ailerons 35a and flaps 36. All three are used to help maintain lift and control at subsonic speeds. At subsonic speeds both sets of adjustable tail and wing control surfaces 22, 23, 22a, 23a, 23b, 35 and 35a may be used to control the aircraft.

As shown in FIGS. 3 and 4, retractable wing tips 24 are provided to lessen wing tip vortices and reduce wing lift losses at low speeds. They are retractable into the retractable subsonic airfoils 16a by hydraulic jacks not shown or other means common to the art. Some air is excavated (pushed out of the way) by the form of the aircraft shown in FIGS. 3 and 4. At design speed and altitude aircraft skin air-excavating angles should be less than 54 percent of the Mach wave angle for that speed. And all aircraft skin angles involved should be feathered to a less angle upstream. In the form of the invention shown in FIGS. 1, 2, 5, 6 and 7, little or not air need be excavated by the aircraft skin. This is possible because adequate thrust may be converted into lift by one or more of the directionally adjustable tail pipes 39. Continued combine thrust and lift may be produced under the front center of the fuselage 18, 18a, 18b by tail pipes 29a. See FIG. 6.

The form of the aircraft shown in FIGS. 5, 6 and 7 will have considerable tail lift without vertical thrust assistance. This lift is produced by the sloping upper surface 27 of the fuselage 18b and tail 19a. To enable the aircraft to make substantially vertical takeoffs, the thrust nozzles 39 may be selectively aimed downwardly as shown by the dotted lines in FIGS. 2, 4, and 6. By comparing FIGS. 1 and 2 with FIGS. 3 and 4 it becomes very evident that a great increase in aircraft housing capacity may be had by increasing the chord length of the supersonic airfoil 15a.

Figure 1:
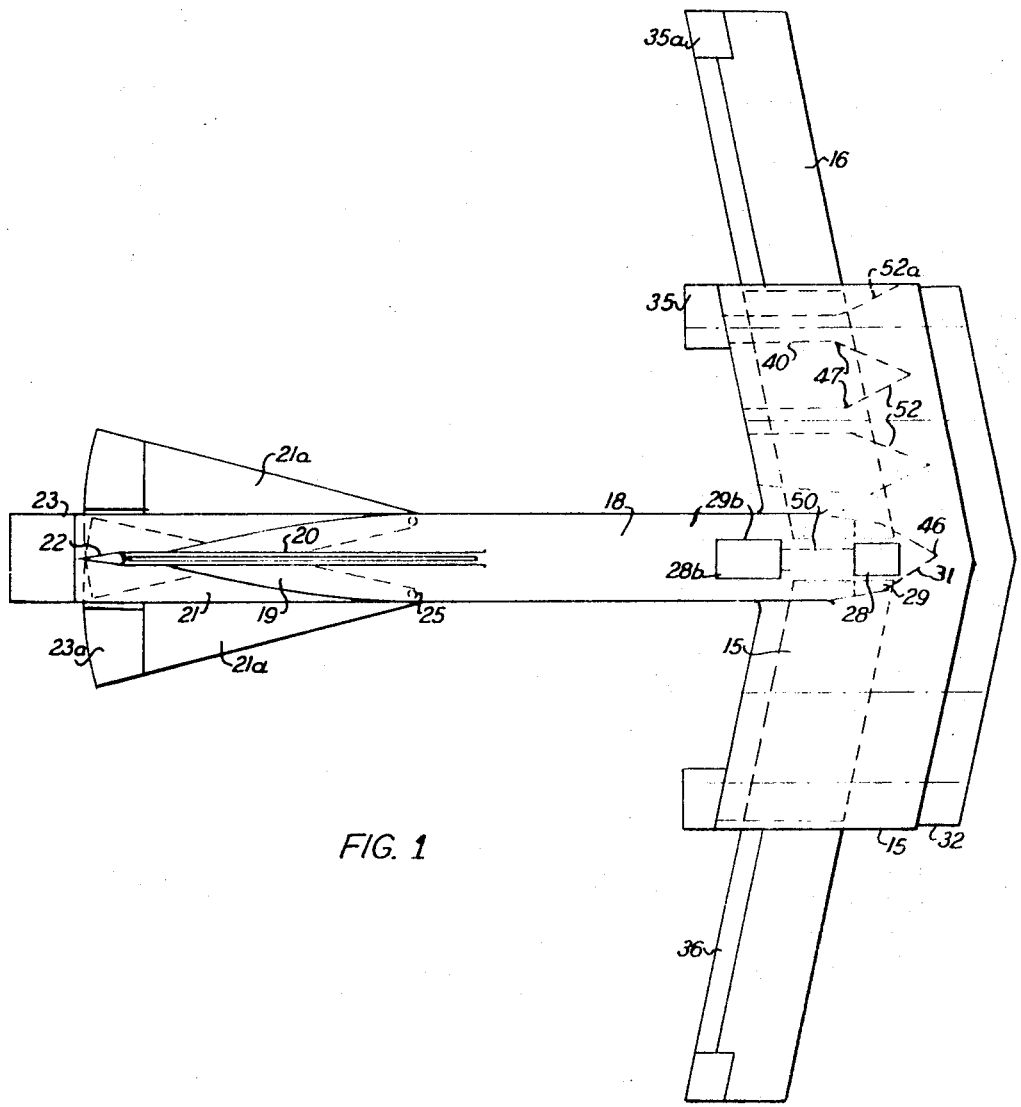
FIGS. 1 and 2 show plan and side elevational view of an aircraft in accordance with the invention.
Figure 2:
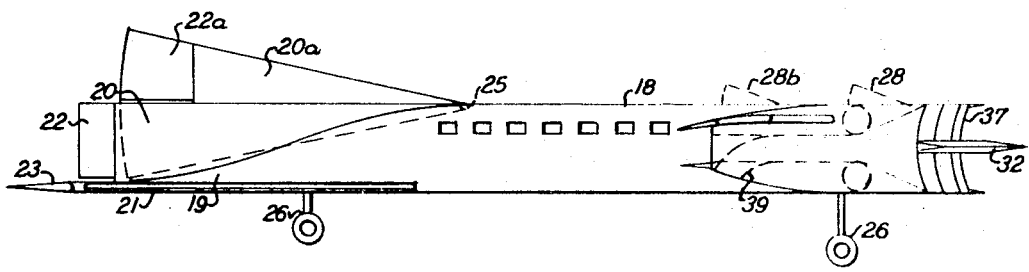

It is to be understood that the subsonic airfoils 16, 16a and 16b are retractable into the supersonic airfoil 15, 15a and 15b as shown in dotted lines therein. The means of retraction may be mechanical, hydraulic or other suitable means as would occur to one skilled in the art. Similar airfoils were disclosed in my U.S. Pat. No. 2,877,965 of Mar. 17, 1959, and in references thereto. The subsonic airfoils 16, 16a and 16b are adapted to be extended, if desired, when the aircraft is traveling at supersonic speeds whereby deceleration is obtained. The same is true of the stabilizers 20a, 21a and 21b. The configuration of the retractable parts and their relationship to other structural members is such that they can be extended at supersonic speeds without requiring undue power. This is particularly true of the airfoils 16 and 16a wherein the relative wind tends to draw such airfoils to an extended position as shown in FIGS. 1 and 3 once the extension thereof is commenced. The adjustable air inlet diffuser 37 is also of a type disclosed in my U.S. Pat. No. 2,877,965. It likewise consists of movable upper and lower diffuser members 44 and 44a. See FIG. 10. Each is securely hinged to the leading edge 45 of the supersonic airfoil 15, 15a and 15b and actuated by suitable means to govern engine air needs and shock wave conditions. To these members 44 and 44a are attached upper and lower overlapping or butted telescoping plates 38, 38a. These plates telescope into the air inlet partitions 52 or ends 52a. In FIGS. 1 and 3 these parts are indicated by dotted lines.

Figure 9:
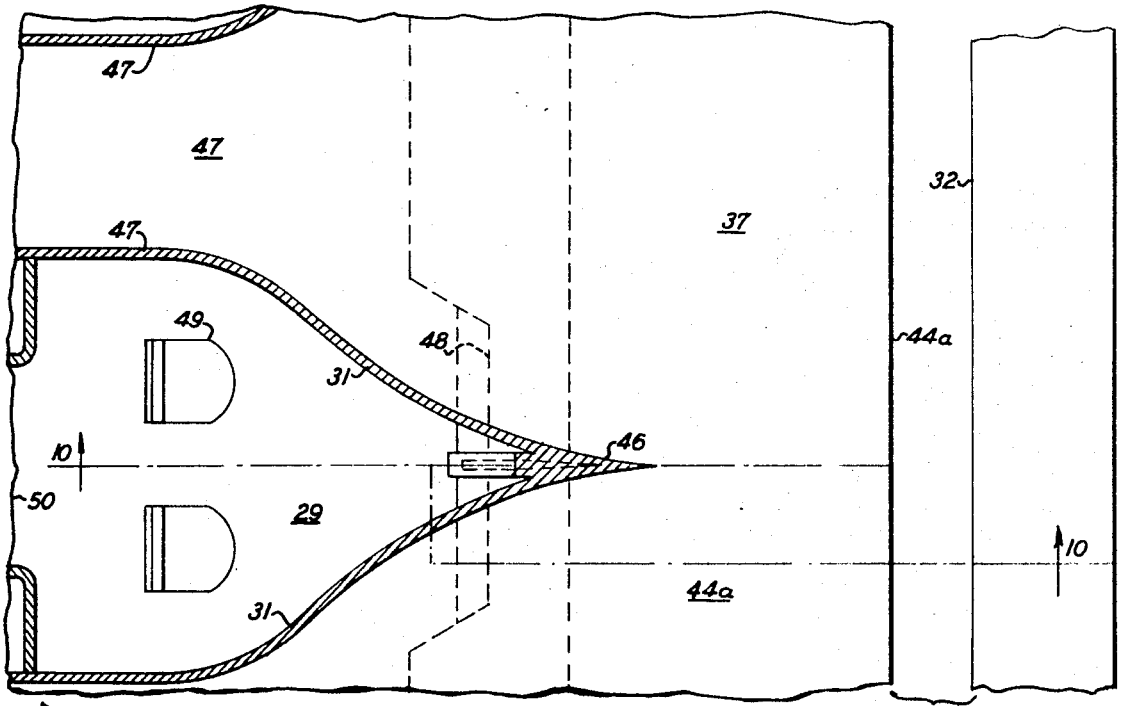
FIGS. 9 and 10 show in section a pilot's cabin disposed behind transparent adjustable air inlet parts and an adjustable shock wave control member for adjustable air inlets.
Figure 10:
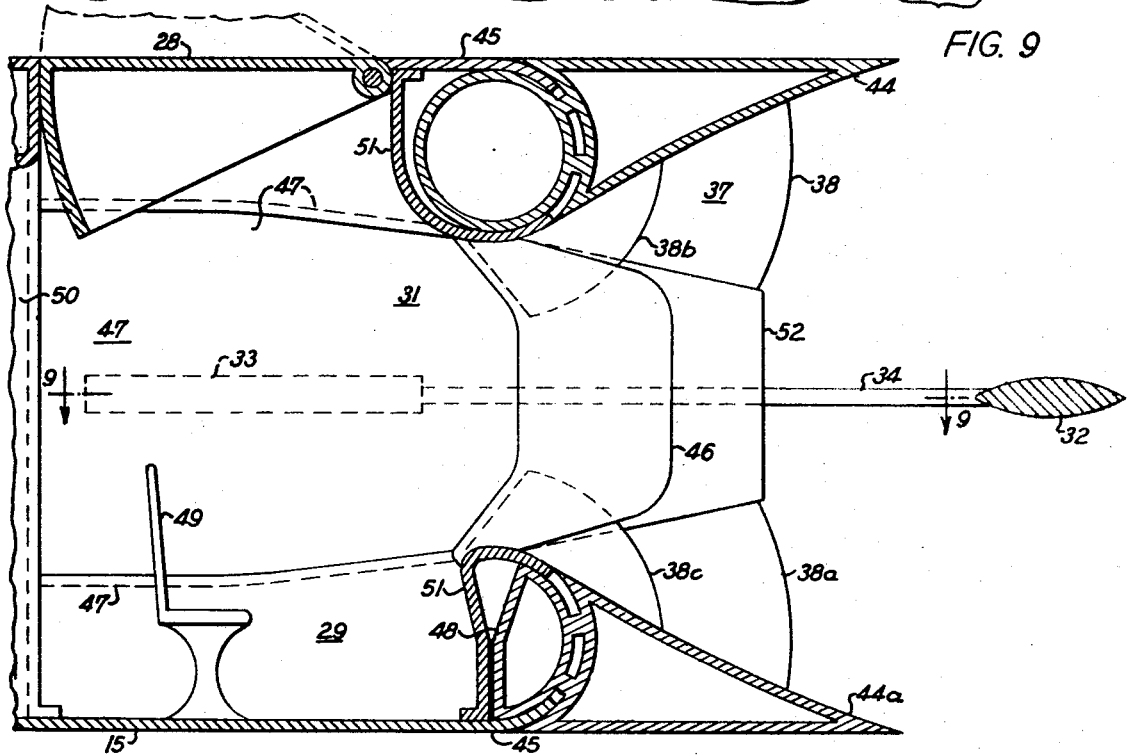

Another type of air inlet partition 46 is shown in FIGS. 9 and 10 and indicated in FIGS. 1—6. It is transparent and has transparent wraparound walls 31 which extend to and form part of the engine air inlet duct 47. These transparent walls 31 provide excellent forward vision from the pilot's forward and side cabins 29 and 29a. Two partition plates 38b and 38c, one attached to the upper diffuser member 44 and the other to the lower member 44a may or may not be used. They telescope into the transparent partition 46 in a butting manner and slide in or out when the diffuser 37 is closed or opened.

Additional foot room or space in the forward cabin 29 can be made available by changing the shape of the shaft portion of the lower diffuser member 44a at 48 just in front of the seats 49 as shown in FIG. 10. Access is provided to the main cabin in fuselage 18, 18a, 18b by passageway 50. The upper and lower front cabin walls 51 make arcuate sliding connections with the diffuser members 44, 44a, as do the top and bottom walls of air ducts 47. Their sidewalls 31 are transparent adjacent the forward and side cabins 29, 29a. From FIGS. 3 and 4 it is apparent that not only forward but top, bottom and side vision may be had from either windowed side cabin 29a behind similar transparent air inlet diffuser parts 31a. Optionally, the partitions 52 and 46 may be transposed. For other diffuser details, see my U.S. Pat. No. 2,877,965.

As shown in FIGS. 9 and 10, an air-splitting plate or shock wave control member 32 is adjustable fore and aft by appropriate means such as hydraulic jacks 33 connected to the control member 32 by means of rods 34. The jacks 33 will normally be secured between the ducts 47. The shock waves produced at supersonic speeds by the control member 32 may be positioned and utilized to help prevent ram compression losses within the diffuser 37.

One or more retractable transparent canopies 28, 28a, 28b and 28c may be provided if desired for increased vision at subsonic speeds, landing, takeoff and on certain types of military aircraft, at higher speeds. They may be located over any cabin 29, 29a and 29b as at the front center, side, or middle center aircraft positions and under the craft as shown in FIG. 6, 28c. They may be hinged at their upstream edge as shown in FIG. 10 and actuated by any suitable means. Their extended positions are shown in dotted lines.

The raised or lowered permanent fuselage distorting cabins 30, and 30a indicated in FIGS. 3 to 6 by dotted lines, may be used. They afford excellent visibility, but the price in increased frontal drag is enormous and the shock wave noises produced may be intolerable.

Figure 8:
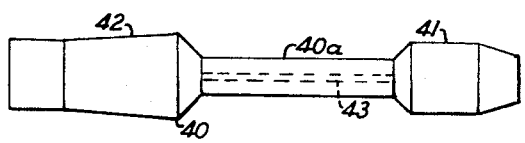
FIG. 8 shows a jet engine or turbojet ram jet combination engine modified so as to increase the housing capacity of the supersonic aircraft in accordance with the invention.

FIG. 8 illustrates a jet engine configuration or a turbojet-ramjet combination engine which is modified to increase the housing capacity of supersonic aircraft. As shown in FIGS. 3 and 4, to convey or contain a given mass of compressed air takes far less space than for uncompressed air. The middle engine connecting portion 40a consists of one or more tubes of any suitable length used to convey the compressed air from the turbine compressor end 41 to the burner and turbine end 42 of the power plant 40. The connecting shaft or shafts 43 may be within the tube or tubes 40a as shown or outside of them.

FIGS. 5—7 show a form of the aircraft which has a greatly increased carrying and housing capacity. It is provided with a rectangular-shaped supersonic airfoil 15b which may be made any convenient length. This aircraft has practically no frontal drag area at design speed and altitude. The retractable horizontal stabilizers 21b swing from suitable hinge joints 25 as may all the retractable stabilizers 20a and 21a. Because of the increased width of the fuselage or body 18b and tail 19a, these stabilizers 21b may be of sufficient size to produce considerable lift at subsonic speeds. When half retracted into the tail 19a their elevators or ailerons 23b may still be used. At design speed they may be stored one above the other or butted at the center of the tail 19a in the hollow horizontal stabilizers 21. The aircraft shown in FIGS. 1—7 may be further controlled by ailerons 35, 35a, flaps 36, 36a and rudders 22 and 22a. In FIGS. 5 and 6 all the retractable parts are shown retracted except the retractable landing gear 26. The retractable subsonic airfoils 16b may be provided with retractable wing tips 24 as shown in FIG. 3. In FIG. 7 all retractable parts are shown retracted.

For increased aircraft frame strength and stability at supersonic speeds and to increase the housing capacity and to reduce noise and drag, there is advantage that the span of the supersonic airfoil be less than four times its chord length and the fuselage have a lateral width of greater than one-sixth of such span, and that the supersonic airfoil fuselage and tail have the same thickness.

There are two primary sources of shock waves produced by the present supersonic aircraft and also by similar known aircraft now under development and construction. These are: (1) shock waves produced by front-end aircraft parts that excavate air outside the aircraft, including protruding stabilizers, and (2) shock waves produced by aircraft lift.

The sonic boom produced by supersonic aircraft superimposes on the ambient atmospheric pressure at the earth's surface a pressure disturbance which has the general features of an "N"-shaped wave. The bow portion of the wave is propagated at a speed which is slightly more than the ambient sound speed whereas the tail portion travels at somewhat less than ambient sound speed which results in a spreading of the sound waves. There is first a rapid impression on the ground followed over a period from about 0.1 to 0.3 second to a progressive underpressure which rapidly cuts off to produce the N wave. The largest variation from ambient pressure is usually associated with the bow wave. With known supersonic aircraft, all of the front-end parts produce shock wave which escape unweakened from the aircraft and form the destructive sonic boom. In contrast, in the aircraft of the invention, a substantial portion of the shock wave is, in effect, swallowed in the air inlet and assists the compression of the incoming air supply for the jet engines. Further, in the present invention the negative half of the N-shaped shock wave is, in effect, separated and weakened because a portion of such waves is, in effect, separated and weakened because a portion of such waves is generated just behind the supersonic airfoil and a further portion is generated behind the tail portion of the aircraft which, with the configuration of the aircraft of the invention, are separated by a considerable distance.

Also, it will be understood that the negative half of the boom wave is an area of low pressure formed downstream of the aircraft above the accumulated shock or pressure waves and behind the trailing edge aircraft parts. By directing a jet stream into the center of this area considerable vacuum can be relieved and the boom wave weakened in the area of its formation.

Atmospheric disturbances of sound, shock and pressure travel in waves. And if special spacing and direction care are not taken, these forces often tend to combine and intensify instead of canceling each other. A good example of this is the addition of pressure waves which takes place under an airfoil. Often even the negative waves generated behind and above airfoils and negative wave ports intensify overall the pressure structure of the shock wave. It is an object of this invention so to space aircraft parts and so to direct shock wave forces whereby they tend to phase out each other. By phasing out is meant to dispose shock waves whereby their forces tend to cancel each other. Such forces relate not only to pressure, but also encompass directional, intensity and temperature relationships. For example, negative shock waves are produced behind a supersonic airfoil, behind the fuselage and tail, and downstream of the underside of the airfoil associated pressure wave formed by the airfoil. By correct spacing of these parts for design speed and altitude, the shock waves so formed tend to cancel each other as they merge together.

The circumstance that the tail portions are separated from the aircraft's lateral axis by some considerable distance also permits the utilization of smaller control and stabilizer surfaces than is the situation with more conventionally designed supersonic aircraft. This in turn reduces the drag and the magnitude of the boom wave.

Large protruding permanent stabilizers and large yaw and pitch control surfaces, each several stories high or as wide, are now considered necessary to control large supersonic aircraft because these surfaces are placed near, or on the aircraft's vertical and lateral axes. In contrast, in the aircraft of the invention, the latter half of the fuselage itself acts as a two-way stabilizer. The control and stabilizer surfaces are located relatively far behind the aircraft's center of gravity. Therefore, comparatively smaller stabilizer and control surfaces are required throughout the aircraft's speed range. The leading edges of these surfaces may be drag shielded, particularly at high speeds. On present publicized proposals for supersonic transport under consideration by the U.S. Government, all the surfaces involved are unshielded and located near dead center; that is, near the aircraft's center of gravity. In the event that a jet engine fails, a tremendous torque must be controlled by surfaces having poor mechanical advantage.

From the foregoing it will be understood that the shock waves produced by the aircraft of the instant invention are significantly less than those which are produced by supersonic aircraft of contemporary design. Nevertheless, a certain amount of shock wave is produced. These shock waves are dissipated by the novel method as will be explained hereinafter.

To save valuable space for an increased payload within supersonic aircraft and to minimize mechanical complications, it is considered best to allow the shock waves due to lift to form—at least partly—and then to dissipate them as they separate from the aircraft or, at least, to start dissipating them prior to their complete formation. In other words, the object is first to accomplish the necessary aircraft lift with the most practical and efficient wing and fuselage shapes, and next to eliminate the adverse effects of the shock waves in the most economical manner.

This is accomplished in the instant invention by directing jet engine thrust streams, or a portion of these streams, downwardly and rearwardly at an angle into the shock wave layer near the trailing edge of the supersonic wing or other high-speed aircraft-lifting part. This also produces some vertical thrust at or near the aircraft's lateral axis where it can most effectively be used without unbalancing the aircraft. These jet streams, which have a velocity much higher than that of sound and of the aircraft, form aft of the craft one or more corrugations in the shock-wave layer which serve to dissipate most if not all of its boom-producing effects.

Since a high velocity jet thrust stream directed at certain large acute angles into a high speed relative wind produces shock waves, it is of course important that the thrust streams be directed so to scatter and dilute more shock waves than they produce.

Properly directed, the jet streams overtake the shock wave layer 54 as depicted in FIGS. 15 and 16, forcing it down in areas ahead of itself (i.e., ahead of its own velocity), thus forming grooves 59 in it. This transforms much of the disturbance into a series of smaller horizontally moving shock waves which meet and tend to cancel out the others' energy. By this method, shock waves are scattered in nearly every direction and further weakened by turbulence. Shock and sound waves are carried along with and follow through the medium in which they are traveling. As part of this medium speeds up, the overall speed of the shock waves in that particular part is also increased. Fast changes in the direction of the medium also effect changes in the direction of the shock waves. Shock waves weakened and scattered at their source are, at the earth's surface, comparatively ineffective.

It is to be understood that although many of the improvements disclosed herein serve to increase the overall efficiency of the aircraft and conserve considerable jet engine power, the use of deflected jet streams to dissipate shock waves due to lift requires an expenditure of additional power.

However, other advantages accrue to the supersonic aircraft as disclosed herein by virtue of adjustable deflected jet streams. Thus the aircraft of invention is enabled through its retractable subsonic airfoils in combination with the deflected thrust to attain extra high altitudes while flying at subsonic speeds. This is advantageous in that it is not necessary for the aircraft to initiate supersonic travel at lower altitudes wherein objectionable supersonic shock waves may be formed.

Obviously, some of the air met by supersonic aircraft must be directed around the fuselage. In the aircraft of the invention the power losses due to this diversion can be reduced about 75 percent by first converting most of the kinetic energy in the diverted airflow into the potential energy of increased air pressure by ram compression at the air inlets. The diversion of the air flow takes place economically due to much reduced velocity and the ram power expended to compress the air is not lost but is regained as thrust in the adjacent jet engines. The rest of the air met by the aircraft flows generally straight through the supersonic airfoil and straight through the other jet engines. Other than to produce lift it is thus not necessary to excavate high velocity air inside or outside supersonic aircraft; a procedure considered very wasteful.

It is believed that the improvements discussed herein are not self-evident. Most certainly they constitute a radical departure from known contemporary approaches to the problem of supersonic travel which largely involve attempt at the conversion of a conventional subsonic aircraft to supersonic operations. It is my belief that the special problems of a supersonic aircraft are of such magnitude that the aircraft must be designed for its primary function and attempts merely, in effect, to design a subsonic aircraft that is faster will eventually fail.

All front-end parts on contemporary supersonic aircraft that excavate air produce shock waves. These shock waves, loaded with power, escape unweakened and thus form destructive boom waves. In the aircraft of the invention these shock waves are maintained in the air inlets. Here they are confined and help compress more efficiently the incoming air supply for the jet engines. Thus the invention overcomes both of the great causes of shock and boom wave formation.

As the aircraft gains in subsonic speed after takeoff, the retractable airfoils and control surfaces may be gradually retracted wholly or partly, particularly at low altitudes. But as the aircraft gains in elevation, the demand for more lift at subsonic speeds is met by extending the said retractable lift surfaces wholly or partly and with the aid of some vertical thrust from the jet engines a very high altitude can be reached before entering the transonic and supersonic speed ranges.

Referring now to FIG. 11, a directionally adjustable tail pipe 53 has a vertical elongated cross-sectional area to give its jet stream 56 an increased relative vertical dimension. Its shape is such to minimize resistance when it discharges diagonally into and through the relative wind under the aircraft. Also, such contour enables the jet flow 56 better to conserve and protect its force from the relative wind and enable it to penetrate deeper into the shock wave layer 54. A suitable air bleeder valve 60 leading from a channel 61 located downstream of air inlet 62 aids in swallowing the shock wave which might otherwise be troublesome at transonic speeds.

As seen in FIG. 12, an extended spout 55 V-shape in cross section at the end of pipe 53 further protects the jet flow 56 down toward the shock wave layer 54. All the flow 56 from a jet engine may be used for this purpose as shown in FIG. 11, or any portion of it by using a deflector 53a as shown in FIG. 13. By means of deflector 53a, a portion of the jet stream is taken from the lower part of the normal downstream jet flow from a tail pipe 39b. Pipes 53 and deflector 53a may also be employed by appropriate adjustment to produce all lift or all horizontal thrust preferably at low speeds such as at takeoff and landing. Moreover, the upstream portion of these tail pipe parts may include a jet stream reversing component 57 which is well known to the art.

A suitable runner 58, as shown in FIGS. 11, 12, and 14, secured to the underside of the supersonic airfoil 15, 15a, 15b or to fuselage 18, 18a, 18b may be provided to shield the downward flow of the thrust stream 56, the adjustable tail pipe 53, or deflector 53a, or both. It first compresses downwardly and then divides the outside air flow immediately in front of the tail pipe 53, or deflector 53a and its spout 55. It may also be provided alone in front of the jet stream 56 or shield any portion of it. Cross sections of runner 58 are shown in FIGS. 12 and 14. An attempt is made in FIGS. 11, 15, and 16 diagrammatically to illustrate the resulting corrugations 59 and other annulling effects of the jet stream 56 on the forming boom waves 54 under a supersonic aircraft. In FIG. 15 several jet streams 56 or portions thereof are directed downward. The center stream may be from near the tail end of the aircraft. In FIG. 16 the effect of a single jet stream 56 to produce a single corrugation 59 is shown. It is to be understood that FIGS. 15 and 16 depict the disruption of the shock wave in a highly simplified manner.

Although I have described the preferred embodiments of my invention, it is to be understood that it is capable of other adaptations and modifications within the scope of the appended claims.

I claim:

1. A method of disrupting shock waves produced by an aircraft flying at supersonic speeds which comprises directing a stream of jet exhaust into the shock wave produced by the aircraft at sufficient velocity to substantially distort the shock wave.

2. A method in accordance with claim 1 wherein said stream's cross section taken in a plane perpendicular to the direction of said stream is elongated in the vertical sense relative to the aircraft.

3. A method in accordance with claim 1 wherein said stream comprises only part of the jet exhaust produced by the aircraft's jet engine.

4. A method of weakening and dissipating the shock and boom waves which are produced principally by the lift of an aircraft traveling at supersonic speeds, which comprises selectively diverting a portion of the exhaust flow from the aircraft's jet engines downward relative to the normal aft flow thereof and into the shock-wave layer of said aircraft thereby forming a corrugation in said shock-wave layer as it is being formed whereby the boom-producing effects of said shock wave layer are disrupted.

5. A method in accordance with claim 4 wherein said diverted flow is diverted from a location proximate the lateral axis of said aircraft.

6. A method in accordance with claim 4 wherein said diverted flow is diverted from proximate the trailing edge of the aircraft's airfoil.

7. A method of disrupting shock waves formed by a supersonic aircraft which comprises directing a high velocity fluid jet into the area of lowest pressure aft of the aircraft with sufficient force to substantially disrupt the shock wave patterns.

8. A method in accordance with claim 7 wherein said fluid jet comprises the exhaust jet stream of the aircraft's jet engines.

9. A jet deflector for the jet engine of a supersonic aircraft comprising a pipe adapted to receive a portion of the jet exhaust from said engine and direct same into the supersonic shock wave formed by said aircraft when flying at supersonic speeds, the deflector being disposed behind a runner member depending from the underside of the aircraft's airfoil, said runner member adapted to divide the relative wind around the exhaust from said pipe and around said pipe.

10. A supersonic aircraft which comprises a fuselage and a supersonic airfoil connected to said fuselage entirely in front thereof, an air inlet completely across the leading edge of said airfoil, jet engines housed within said airfoil, tail pipes for thrust from said engines adjacent the trailing edge of said airfoil, the lateral axis of said aircraft being proximate said tail pipes, and means for adjusting said tail pipes selectively to produce thrust horizontally and at angles downward and obliquely downward relative to said airfoil.

11. The method of greatly reducing and eliminating the kinetic energy losses produced as form and wave drag by aircraft flying at supersonic speeds which consists of first ram compressing the undisturbed air met by the aircraft in an air inlet that extends across and covers the leading edge of a supersonic shaped airfoil and then conducting only the centermost portion of this low velocity compressed air laterally within said air inlet to miss the downstream located fuselage and into thrust producing jet engines housed within said airfoil, the other portion of said ram compressed air conducted straight through said airfoil and straight through other similarly housed jet engines.